Feb. 24, 1953 D. M. MURPHY 2,629,813
ADJUSTABLE LAMP CARRIER
Filed Feb. 4, 1948 4 Sheets-Sheet 1

David M. Murphy INVENTOR.
BY Smith, Olsen & Baird,
Attys.

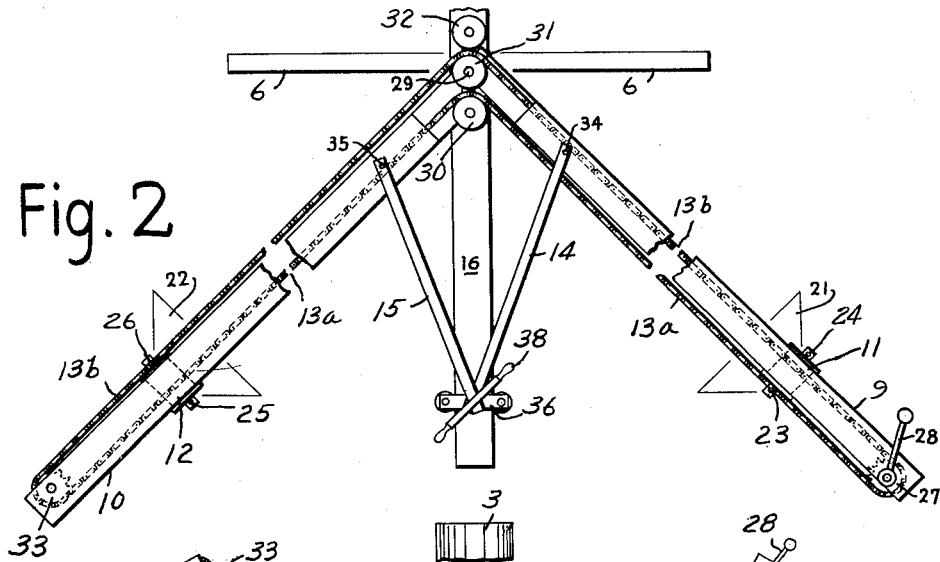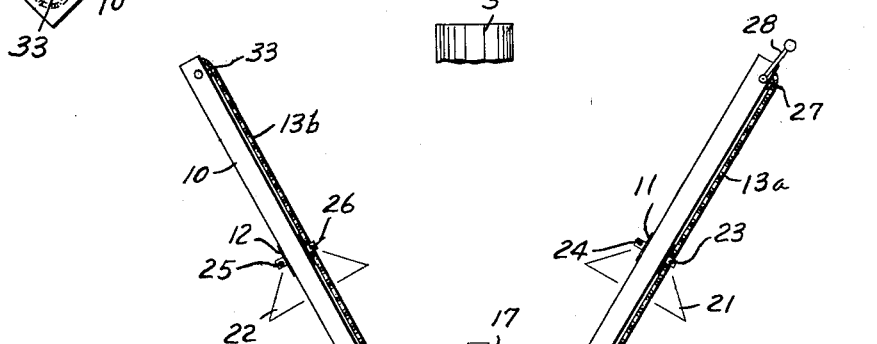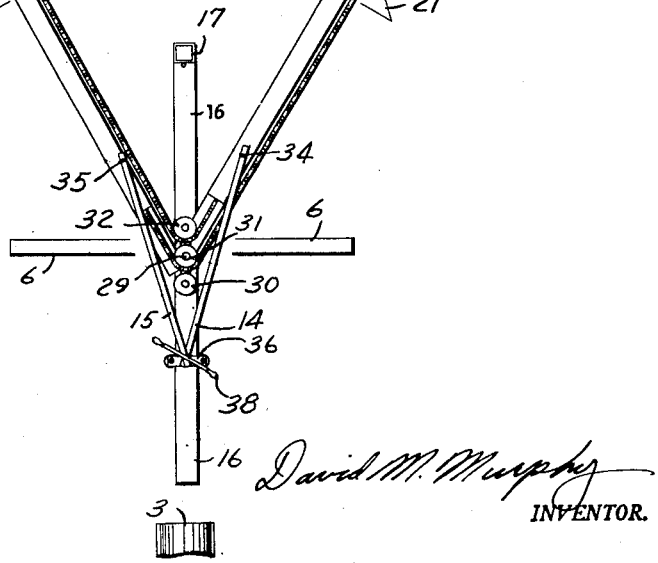

Feb. 24, 1953  D. M. MURPHY  2,629,813
ADJUSTABLE LAMP CARRIER
Filed Feb. 4, 1948  4 Sheets-Sheet 3

David M. Murphy
INVENTOR.

BY
Smith, Olsen & Baird,
Attys.

Feb. 24, 1953 D. M. MURPHY 2,629,813
ADJUSTABLE LAMP CARRIER
Filed Feb. 4, 1948 4 Sheets-Sheet 4

David M. Murphy
INVENTOR.

BY Smith, Olsen & Baird
Attys.

Patented Feb. 24, 1953

2,629,813

UNITED STATES PATENT OFFICE 2,629,813

ADJUSTABLE LAMP CARRIER

David M. Murphy, Mason City, Iowa

Application February 4, 1948, Serial No. 6,203

10 Claims. (Cl. 240—1.3)

This invention relates to improvements in means for mounting and adjusting the lamps or other sources of light which are employed in conjunction with cameras used in the photoengraving and photolithographic industries for illuminating the copy to be reproduced.

In photographic reproducing apparatus of this kind it is common practice to mount the copyboard or holder on a track for relative movement with respect to a camera positioned adjacent the opposite end of the track, whereby there is obtained the desired degree of magnification or reduction of the copy on the film or sensitized sheet mounted at the rear of the camera lens. The lens is mounted at the forward end of the camera and is directed toward the copyboard which holds the copy in a vertical position at right angles to the focal axis of the lens and approximately centered with respect to that axis. The copy is usually illuminated by two arc lamps mounted to move with the copyboard and on opposite sides of the focal axis of the camera somewhat forwardly of the face of the copyboard so that they illuminate the copy.

In the operation of such a camera, various sizes and types of copy are encountered in the course of a day's work, thus requiring different arrangements of the sources of illumination in order to obtain the best results in a minimum of time. If the lamps are too close to the copy, the edges of the copy nearest the lamps will be more brilliantly illuminated than the remaining portions of the copy, thereby producing a photographic effect which is very undesirable for most types of work. The area of the board covered by the copy is, however, the only portion of the copyboard upon which the operator must preserve substantially uniform illumination, and the lamps may, therefore, be positioned at lesser distances from the center of the copyboard for small copies than for large ones. It is desirable to position the lamps as closely as practicable to the copy, due to the fact that the intensity of illumination of a given surface varies inversely as the square of the distance of said surface from the source of illumination, while the exposure time for a given sensitivity of film or plate, at a given aperture of the lens, varies inversely as the intensity of the illumination of the copy. For example, the illumination of a large copy may require the lamps to be withdrawn to a distance of six feet from the center of the copy and exposure time may be eight minutes. With a small copy, the lamps may be found to give satisfactory uniform illumination at a distance of only three feet and the exposure time may then be only two minutes. A great saving of camera time may therefore be brought about and the production per unit increased by properly adjusting the lamps for each exposure to suit the character of the copy. This saving of camera time may be very important in many operations, for example, in newspaper work but the advantage of readjusting the lamps to suit the type or size of the copy has not heretofore been fully realized because of the loss of time in making the adjustment, arising from the fact that no satisfactory equipment has heretofore been available for supporting the lamps and permitting their adjustment without requiring the operator to move from one side of the camera to the other to adjust the lamps, thus consuming a great deal of time which decreases the number of exposures per hour (or day) and thereby reduces the output of the camera.

It is, therefore, the principal object of the present invention to provide a new and improved adjustable mounting for the lamps associated with a camera and its copy-board, whereby both lamps or sets of lamps may be simultaneously and quickly adjusted from a position at one side of the camera to effect the best and most uniform illumination of copies of various types and sizes. A further object is to provide improved lamp supporting means which will permit the angle of incidence of the light beams on the copy and the distance of the lamps from the copy to be readily and independently adjusted by the operator without moving from his position. Another object of the invention is to provide for use with a process camera a lamp carrier for a pair of lamps comprising interconnected adjusting mechanism whereby the lamps may be adjusted simultaneously and uniformly to vary their spaced relation to a copyboard and the angles of incidence of the light rays upon the copyboard while causing both lamps to be at all times equidistant from the copyboard and maintaining equal angles of incidence of the light rays on the copyboard. More particularly, it is an object of this invention to provide an arrangement of apparatus in which two lamps are supported upon divergent relatively adjustable arms, pivoted in a vertical plane containing the focal axis of the camera and in alignment with the vertical center line of the copyboard, and are capable of relative adjustment with respect to the arms longitudinally thereof, so that the angle of incidence of the light rays on the copy and the distance of the lamps from the copy may be easily and quickly adjusted. Still another object of the invention is to provide a translucent copyboard in combination with means for supporting a pair of arms pivoted in the vertical axis of the copyboard, and means for adjusting the lamps along the arms and for swinging the arms to move the lamps from positions in front of the copyboard to positions at the rear of the copyboard where they may be employed to illuminate a transparent copy mounted on the copyboard while at the same time maintaining in operation the means for adjusting the lamps along the arms. A further object is to provide a camera having a copyboard with a pair of lamps having interconnected supporting means whereby a movement of one lamp effected from a position at one side of the camera to vary the angle of incidence of its light rays on the copyboard will cause a simultaneous and equal adjustment of the other lamp. Other objects relate to various features of construction and arrangement which will appear more fully hereinafter.

The nature of the invention will be understood from the following specification taken with the accompanying drawings in which three embodiments of the invention are illustrated. In the drawings, Figure 1 shows a side elevation of one form of the invention which is somewhat diagrammatically illustrated in association with a camera and its copyboard;

Fig. 2 shows a top plan view of a portion of the apparatus illustrated in Fig. 1, with parts broken away, illustrating the arrangement when the supporting arms of the lamps diverge toward the position occupied by the camera;

Fig. 3 shows a top plan view of the apparatus illustrated in Fig. 2 with the supporting arms of the lamps adjusted so that they diverge away from the position occupied by the camera;

Figure 7:
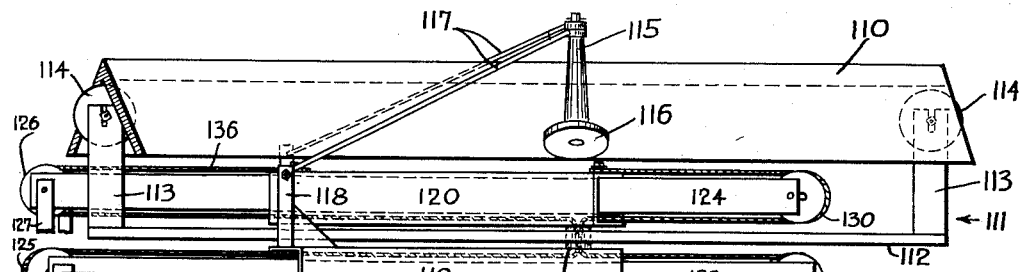
Figure 8:
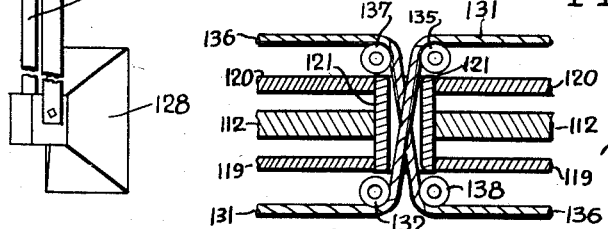

Fig. 7 shows a partial perspective view of the principal parts of a third form of the invention in which the supporting arms are movable longitudinally for the purpose of changing the positions of the lamps, instead of moving the lamps on the supporting arms; and Fig. 8 shows an enlarged vertical section through portions of the lamp supporting arms illustrated in Fig. 7, illustrating the arrangement of the operating cables.

Figure 1:
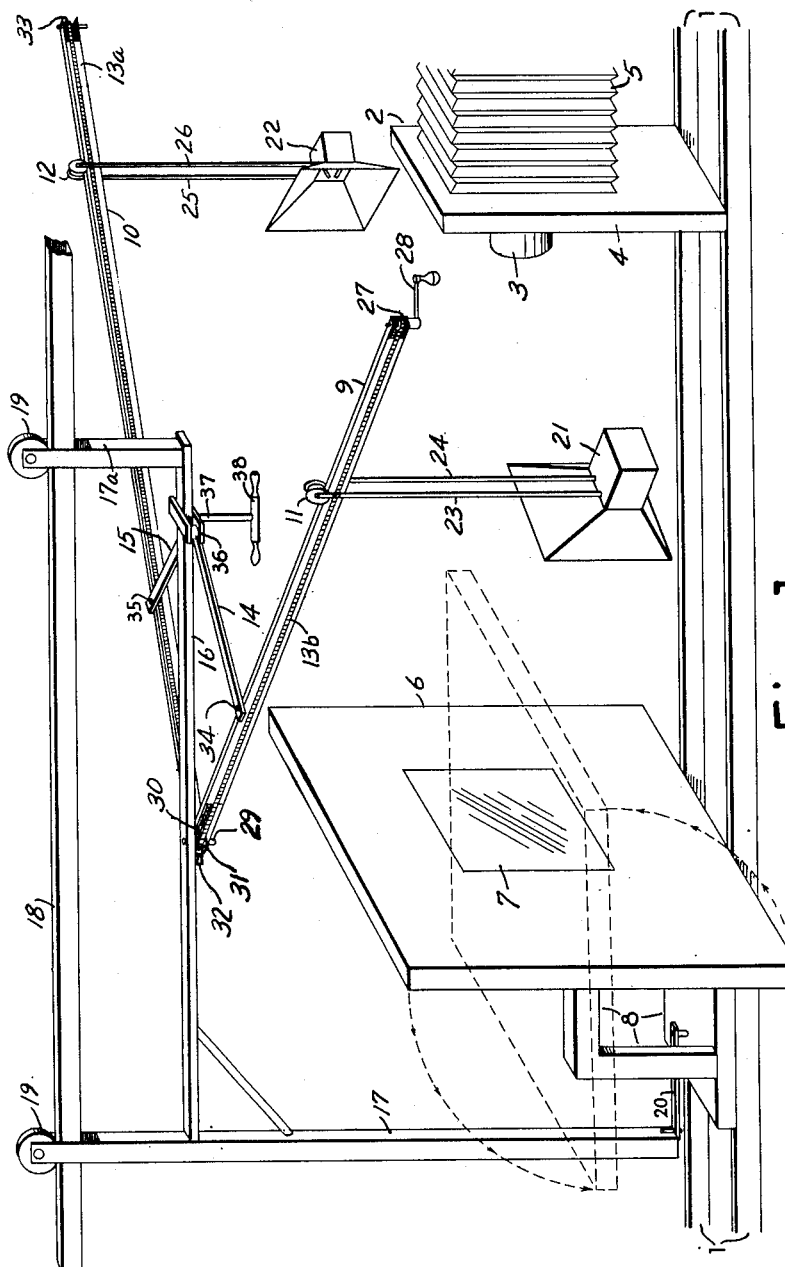

In Figs. 1, 2 and 3 of the drawings, there is somewhat diagrammatically illustrated a simple form of the invention. In Fig. 1 the camera is shown as comprising a pair of horizontal tracks 1 which extend parallel to each other and support the camera 2 which includes the lens housing 3, the lensboard 4, and the usual extensible bellows 5. The lensboard 4 is adjustable longitudinally of the horizontal tracks 1 toward and from a copyboard 6 which extends in a vertical plane trasversely to the facal axis of the camera and contains a centrally located translucent plate 7. This copyboard is capable of being angularly tilted, by means not illustrated, to the position shown by dotted lines in Fig. 1, and it is mounted on a slide 8 which is capable of being adjusted longitudinally of the tracks 1 for the purpose of regulating the position of the copy with respect to the lens of the camera.

The apparatus includes two arc lamps 21 and 22 which are supported by arms 9 and 10 mounted on a frame structure comprising vertical members 17 and 17a provided with rollers 19 which are adapted to travel upon an overhead track 18. The lower end of the upright member 17 is pivotally connected to a bar 20 which is in turn pivoted on the slide 8 so that when the copyboard 6 and the frame 8 are adjusted longitudinally of the tracks 1 for focusing or other purposes, the frame structure is simultaneously adjusted bodily upon the track 18 to effect a bodily adjustment of the lamps 21 and 22 longitudinally of the tracks 1. The member 17 is spaced some distance from the copyboard to permit the above described tilting of the copyboard to its horizontal position and also to prevent it from casting a shadow on the translucent glass 7 when a transparent copy is to be illuminated by placing the lamps 21 and 22 at the rear of the copyboard as shown in Fig. 3. By providing pivotal connections between the ends of the link 20 and the copyboard and lamp carrier, possible vibration or lateral movement of the carrier or misalignment of the overhead track with respect to the tracks 1 will not be transmitted from one of the connected members to the other.

The lamp 21 is suspended by rods 23 and 24 from a flanged roller 11 which is mounted to travel longitudinally of the arm 9 to permit a corresponding adjustment of the position of the lamp. Similarly, the lamp 22 is supported by rods 25 and 26 from a flanged roller 12 which is mounted to travel longitudinally of the track 10 to permit a corresponding adjustment of this lamp.

Both of the arms 9 and 10 are of channel form with their flanges directed inwardly and the outer or rear ends of these arms are pivoted on a pin 29 which is fixed in the horizontal frame member 16, the pivot 29 being located in a vertical plane containing the focal axis of the lens of the camera 2 and the center of the copyboard 6, as well as substantially coaxial with the vertical center line of the copyboard as shown in Figs. 2 and 3.

In order to vary the divergence of the arms 9 and 10 they are connected by links 14 and 15, respectively, with a cross head 36 which is mounted to slide longitudinally of the horizontal member 16 and which is capable of being secured in adjusted position on that member by a screw 37 operated by a handle 38. The outer ends of the arms 14 and 15 are pivoted at 34 and 35, respectively, to the arms 9 and 10 and, by adjusting the cross head 36 longitudinally of the member 16, the divergence of the arms 9 and 10 may be varied and they may even be reversed so that they diverge away from the lens as shown in Fig. 3, in which position they are behind the copyboard.

For the purpose of adjusting the lamps 21 and 22 longitudinally of the supporting arms 9 and 10, respectively, the supports for these lamps are connected to an endless sprocket chain 13 which is mounted on sprocket gears 27 and 33 located at the outer ends of the arms 9 and 10, respectively, between the upper and lower flanges thereof, and also around sheaves or sprockets 30 and 31 which are rotatably mounted on the member 16 at or adjacent to the pivotal point of the arms 9 and 10. In the construction shown, the sprocket or sheave 31 is mounted on the pivot 29 and the sprocket 30 is mounted on another pivot located forwardly of the pin 29. When the two arms diverge toward the lens, the endless chain passes around the sheaves or sprockets 30 and 31 as shown in Fig. 2, but when the arms are reversed to occupy the position illustrated in Fig. 3, the chains engage the sheave or sprocket 31 and an additional sprocket 32 mounted rearwardly of the sprocket 31, as illustrated in Fig. 3, and the sheave or sprocket 30 is then idle.

The outer stretches 13a of the endless chain travel outside of the arm 9 and inside of the arm 10, while the inner stretches 13b of this chain travel inside of the arm 9 and outside of the arm 10. The outer stretch 13a of the chain is connected to the rod 23 of the lamp 21 and the inner stretch 13b adjacent the other arm 10 is connected to the rod 26 of the lamp 22 so that when the chain is moved on its supporting sheaves or sprockets, the two lamps 21 and 22 are simultaneously adjusted longitudinally of the arms 9 and 10 in the same direction, that is, either toward the pivot 29 or away from that pivot. This adjustment of the lamps by the operation of the chain 13 is effected by a crank 28 which is shown as being mounted on the shaft of the sprocket 27, although it may also be mounted upon the shaft of the sprocket 33, depending upon the construction of the camera or the operator's preference.

By the foregoing arrangement, it is apparent that the two lamps 21 and 22 may be simultaneously adjusted toward and from the copyboard 6 so that they occupy, at all times, positions which are substantially the same distance from the copy and the angle of incidence of the light rays on the copy is the same for both lamps. Also, the angle of incidence of the light rays, just referred to, may be varied by varying the angular positions of the arms 9 and 10 with respect to a median plane containing the focal axis of the lens and the center of the copyboard. The two arms maintain at all times substantially the same angle with respect to this median plane and this angle may be varied, as described above, by adjusting the position of the cross head 36 on the frame member 10. This is preferably done by loosening the setscrew 37 by turning the handle 38 and then applying a rotational pressure to the arm which is nearer the operator, thereby effecting a longitudinal movement of the cross-head and a simultaneous and equal angular movement of the other arm. Upon again tightening the setscrew accidental alteration of the angles of incidence of the light upon the copy is prevented. These adjustments of the arms 9 and 10 and of the positions of the lamps 21 and 22 on those arms may be effected by the operator from a position at one side of the assembled apparatus and they may be quickly performed so that little time is lost between successive operations of the camera in reproducing copies are carried successively by the copyboard 6. If it be desired to obtain unequal illumination by the two lamps in order to obtain special effects, the lamp 22 (assumed to be farther from the operator) may first be adjusted to the desired position by the use of the interconnecting mechanism as described above and the lamp 21, nearer the operator, which will have thereby been correspondingly adjusted, may then be manually adjusted independently to a different position after first detaching the link 14 from the pin 34 and disconnecting the strand 13b of the chain from the rod 23.

Figure 4:
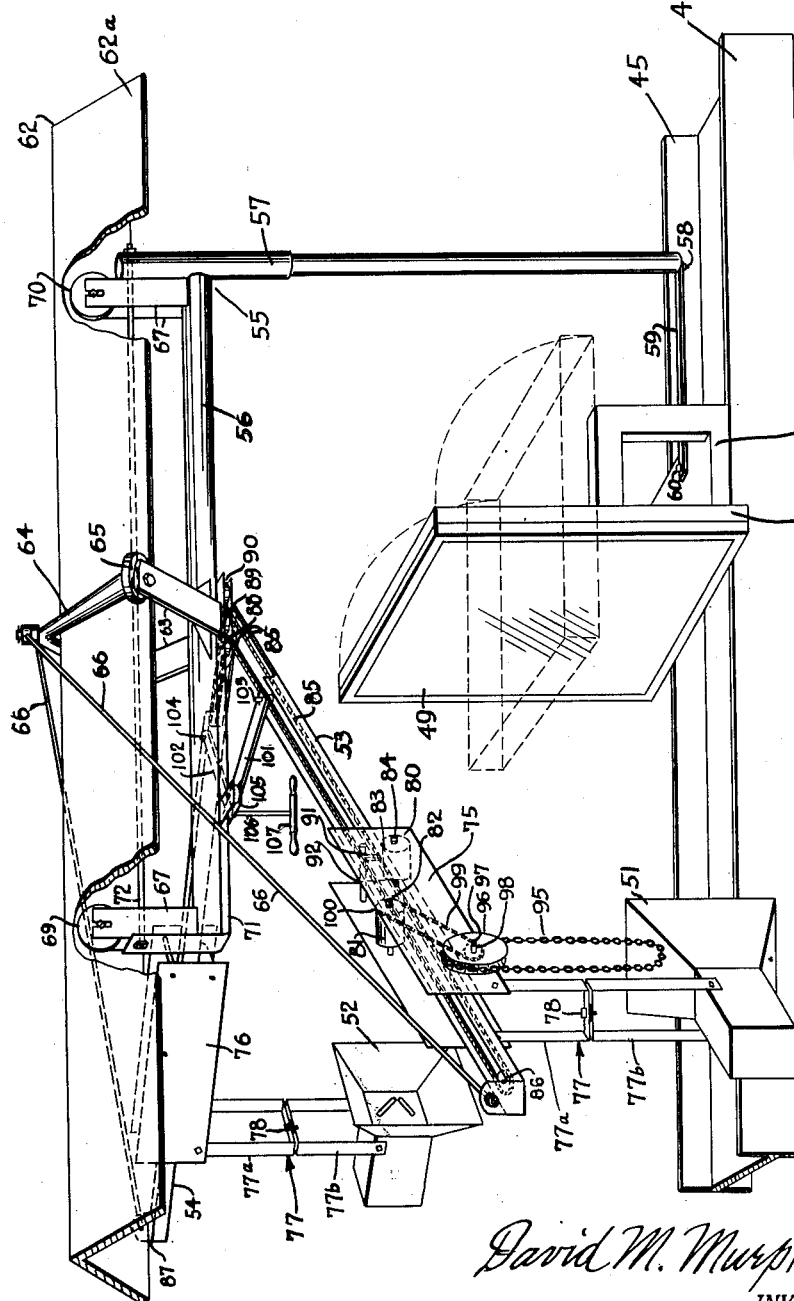
Fig. 4 is a perspective view of the principal features of a modified form of the invention.
Figure 5:
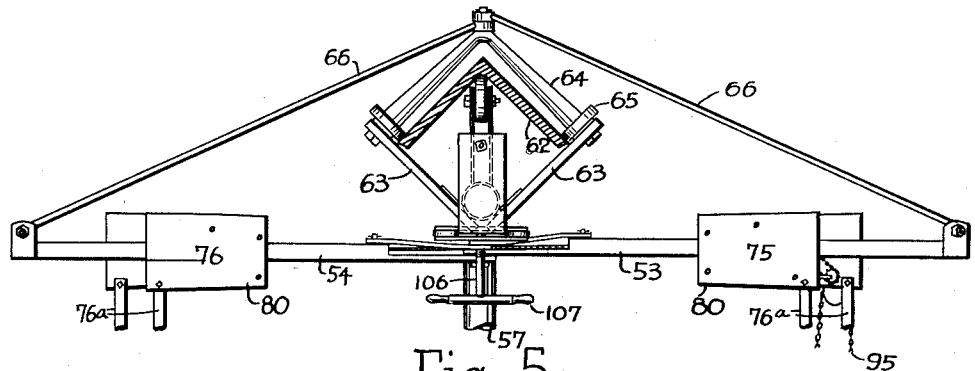
Fig. 5 shows an end elevation of the apparatus illustrated in Fig. 4.
Figure 6:
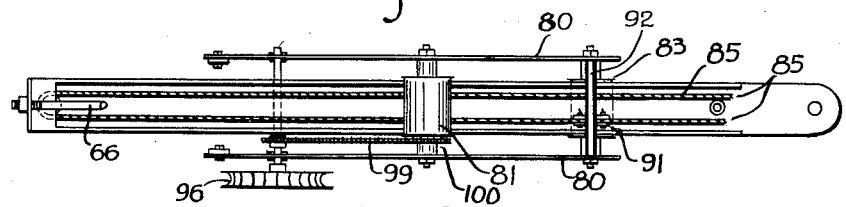
Fig. 6 shows a top plan view of one of the supporting arms illustrated in Figs. 4 and 5, with the associated lamp carrier mounted thereon.

In the form of the invention illustrated somewhat diagrammatically in Figs. 4, 5 and 6, the portion of the apparatus shown comprises parallel horizontal tracks 45 which may be the side flanges of an I-beam, as illustrated, upon which there is mounted a slide 47 carrying a copyboard 48 which is provided with a translucent plate 49 and which is capable of being tilted to the horizontal position illustrated by dotted lines for convenience in attaching the copy. Certain parts of a camera including a bellows, light-tight chamber and lens similar to those shown in Fig. 1 are also mounted on the tracks 45 in the manner previously described for movement toward and from the copyboard and the copyboard is capable of adjustment on the tracks for varying its position with respect to the camera. This form of apparatus is shown with two lamps 51 and 52 which are suspended from horizontal arms 53 and 54 mounted for pivotal movement on an overhead structure for the purpose of varying the angle of incidence of the light rays from the lamps upon the copy carried by the board 48. The arms 53 and 54 and the lamps 51 and 52 are supported by a carriage 55 comprising a horizontal member 56 and a vertical member 57. The member 57 extends downwardly to the region of the tracks 45 and is loosely pivoted at 58 to a bar 59 which extends in a forward direction and is loosely pivoted at 60 to the slide 47 so that when the copyboard is moved longitudinally it carries with it the carriage 48.

The carriage is supported by an overhead track 62 which is in the form of an inverted angle bar having its flanges of equal width diverging downwardly. This track 62 is suitably supported at its ends by means not shown. The bar 56 of the carriage has welded or otherwise secured thereto, at an intermediate point, two upwardly diverging arms 63 which are secured at their ends to the outer extremities of the arms of a V-shaped bracket 64. These arms of the bracket 64 have rotatably mounted thereon at their lower extremities rollers 65 which are adapted to travel on the upper surfaces of the flanges 62a of the track 62. The upper part or apex of the bracket 64 is connected by guy rods 66 with the outer ends of the arms 53 and 54 by which the lamps are carried, thus supporting these arms and maintaining them in their horizontal positions. The carriage 55 also comprises upwardly extending posts 67 which are slotted at their upper ends for engagement by the pivots of rollers 69 and 70 which are adapted to engage the underside of the V-shaped track 62 at the apex thereof so that they cooperate with the rollers 65 in supporting the carriage 55 on the track. When the arms 53 and 54 are in the positions shown in Fig. 4, the load is carried by the rollers 65 and 70 engaging the track but, if the arms 53 and 54 are swung to positions corresponding to those shown in Fig. 3, the load will be carried by the rollers 65 and the upward thrust of the roller 69 on the under side of the track 62. The connection with the bar 59 of the lower end of the member 57 is sufficiently loose to permit this pivotal movement of the carriage without disturbing the position of the copyboard upon the tracks 45. One of the posts 67 is welded or otherwise secured to one end of the member 56 and to the upper part of the member 57 and the other post 67 is welded to the upturned end of a bar 71 which is welded to the member 56 and which serves the purpose of the bar 16 of the construction previously described. The upper end of the upturned portion of the bar 71 is connected by a rod 72 with the upper end of the member 57, thus supporting the outer end of the member 57—71. With this arrangement, it will be apparent that the carriage 55 is mounted to move freely in a direction longitudinally of the track 62 and that it carries with it the lamps 51 and 52 which are supported by the arms 53 and 54, respectively, in response to any longitudinal adjustment of the connected copyboard 48.

The arms 53 and 54 are in the form of channel bars having their flanges directed upwardly and having the outer ends of their back walls turned upwardly for connection with the rod 66 and they carry the relatively movable boxes or carriers 75 and 76 from which the lamps 51 and 52, respectively, are suspended. This suspension is effected by means of hangers 77 each of which is formed in two U-shaped parts 77a and 77b which have their transverse portions pivotally connected by clamping bolts 78. The upper parts are pivoted on the outer lower portions of the carrier 75 and the arms of the lower hanger portion 77b are pivotally connected to the lamps at points substantially above the centers of gravity of these lamps. With this arrangement, the lamps are freely suspended and find their proper horizontal positions by the action of gravity so that if there is any collision with a workman or with some object in the vicinity of the photographic apparatus, there will be no injury to the lamps or their supports and they will find their proper positions when the cause of the collision has been removed. The clamp 78 may be adjusted to secure the lamps in desired angular positions so that the light beams may be properly directed with respect to the copyboard 48.

The boxes or carriers 75 and 76 comprise a pair of side plates 80 which are rigidly connected with each other and which extend on opposite sides of the arms 53 and 54, respectively. Each box or carrier also comprises a roller 81 mounted on a shaft 82 which has its ends secured in the side plates 80 and this roller is adapted to travel upon the upper edges of the flanges of the arm 53 or 54 with which it is associated. Each of the boxes or carriers 75 and 76 also comprises a lower roller 83 mounted on a shaft 84 which is secured in the side plates 80 and these rollers contact with the undersides of the arms 53 and 54 during the movement of the carriers longitudinally of the arms. The rollers 83 are positioned near the ends of the side plates 80 opposite to the points from which the lamps are suspended by the hangers 77 so that the weight of the lamps maintains the rollers 81 and 83 in contact with the arms 53 and 54.

The movement of the boxes or carriages 75 and 76 longitudinally of their supporting arms is transmitted from one carrier to the other through an endless cable 85 which passes around pulleys or sheaves 86 and 87 mounted at the outer ends of the arms 53 and 54, respectively, and between the sheaves or pulleys 88, 89 and 90 which are mounted at the point of convergence of the arms 53 and 54. These arms are mounted on a common vertical pivot carried by the carriage 55 at the point where the members 63 are attached and this pivot is in a vertical plane containing the focal axis of the camera and the center of the copyboard 48, as in the form of the construction previously described. The endless cable 85 passes around the sheaves or pulleys 88 and 89 when the arms 53 and 54 converge in a direction away from the copyboard as illustrated in Fig. 4, but if they were reversed and caused to occupy a position corresponding to that in Fig. 3, the cables would move into engagement with the sheaves or pulleys 89 and 90 and the sheave or pulley 88 would then become inactive. The outer stretch or strand of the cable passing above one of the arms 53 is connected by a clamp 91 with a rod 92 which is secured to the side plates 80 of the carrier 75 and the inner stretch or strand of the cable passing above the other arm 54 is similarly connected to a rod extending between the side plates of the other carrier 76 so that when one carrier is moved longitudinally of its arm, the other carrier will be moved to the same extent and in the same direction on its supporting arm.

The motion of the carriers 75 and 76 longitudinally of their supporting arms is effected by an endless hand chain 95 which passes around a chain wheel 96 fixed on a shaft 97 which is secured in the side plates 80 of the carrier 75. This shaft also carries a sprocket pinion 98 upon which is mounted an endless sprocket chain 99 extending to and around another sprocket chain 100 fixed to the roller 81 previously described. Upon actuating the endless chain 95, the roller 81 of the carrier 75 is thus actuated to move this carrier longitudinally of the supporting arm 53 and, through the movement of the cable 85, a corresponding movement of the other carrier 76 in the same direction is thereby brought about.

In order to vary the angular relationship of the arms 53 and 54 with respect to each other and with respect to a vertical median plane containing the focal axis of the camera and the center of the copyboard, the two arms 53 and 54 are connected by links 101 and 102 which are pivoted on these arms at points 103 and 104, respectively, and which have their forward ends pivotally connected to a cross head 105 mounted to slide on the bar 71. This cross head is secured in adjusted position by a setscrew 106 and a handle 107 after it has been adjusted to bring about the desired angles of incidence of the light beams upon the copy.

In the form of the mounting shown in Figs. 4, 5 and 6, also, the loose connection of the bar 59 with the copyboard and the lamp carriage allows some relative vertical and lateral movement of the camera track 45, thus permitting possible misalignment of this track and the overhead rail in both vertical and horizontal planes and allowing for vibrations in the support of the camera track 45 without disturbing the lamp carrier. The V-shaped trough coacting with the rollers 65 and 69 and 70, engaging its opposite sides serves to restrain lateral movement of the lamp carrier while permitting free longitudinal movement thereof.

The form of the invention which is partially illustrated in Figs. 7 and 8 is somewhat similar to that illustrated in Figs. 4, 5 and 6 except that it involves a reversal of the actuating mechanism so that the supporting arms of the lamps are themselves moved longitudinally to vary the spaced relation of the lamps and the copyboard, instead of adjusting the lamps longitudinally of their supporting arms. This arrangement is of particular advantage where the space occupied by the camera is limited. In this form, there is a V-shaped supporting track 110 on which there is mounted to travel a carriage 111 comprising a horizontal bar 112 and two connected upright members or posts 113 upon which are mounted rollers 114 adapted to engage the inner underside of the track member 110 as in the form shown in Figs. 4, 5 and 6. The carriage 111 also comprises a V-shaped bracket 115 provided with rollers 116 which are arranged to travel on the lower edges of the outer surfaces of the downwardly diverging flanges of the track. The upper part of the bracket 115 is connected by rods 117 with members 118 which form part of the carriage and are secured to tubular carriers 119 and 120. These carriers are pivotally connected together through a hollow member 121 and they have slidably mounted therein the lamp supporting arms 123 and 124. These arms have rotatably mounted on the forward ends thereof the sheaves or pulleys 125 and 126, respectively, and on the axes of these sheaves or pulleys there are pivotally suspended a pair of hangers 127 from which are suspended the arc lamps 128. These supporting arms 119 and 120 are provided at their other ends with sheaves or pulleys 129 and 130, respectively. A cable 131 is secured to the underside of the carrier 119 and is then extended around the pulley 125, beneath a roller 132 through the hollow pin 121 over another roller 135 and then around the roller 130 carried by the arm 124 from which point the cable extends forwardly and is secured to the upper side of the carrier 120. In a similar manner, another cable 136 is secured to the upper side of the carrier 120 and is then extended around the pulley 126 and beneath the arm 124 to an intermediate point where it passes around a pulley 137 and thence downwardly through the hollow pin 121. After passing through this hollow pin, the cable 136 is carried around another pulley 138 and thence around the pulley 129 from which it is extended in a forward direction and secured to the underside of the carrier 119.

With this arrangement, the actuation of either cable as, for example, the actuation of the cable 131 by a crank applied to the extended shaft 139 of the pulley 125, will impart motion to the supporting arm 123 and a corresponding motion in the same direction to the other carrier 124 with the result that both lamps 128 will be moved simultaneously and to the same extent in the same direction.

The illustration of Figs. 7 and 8 is, of course, incomplete but the parts illustrated are intended to be used with a copyboard and a camera such as those previously described, and relative angular adjustment of the lamp supporting arms may be effected and maintained through the operation of connecting links and clamping mechanism similar to those previously described in connection with the other embodiments of the invention.

Although certain forms of the invention have been shown and described by way of illustration, it will be understood that it may be constructed in various other embodiments which come within the scope of the appended claims. In the claims the "working surface" of the copyboard is intended to refer to that plane of the copyboard upon which the graphic material to be photographed is affixed.

I claim:

1. The combination in a camera, of a copyboard extending transversely to the focal axis of said camera, an overhead track, a carriage mounted for movement on said track in a plane containing said focal axis, a pair of carriers and a pair of arms mounted on said carriage, a pair of lamps, each lamp being supported by one carrier and one arm, means for effecting relative movement of each carrier and its associated arm to adjust the spaced relation of the connected lamp and said copyboard, and means for simultaneously adjusting the spaced relation of said arms with respect to said plane while maintaining the spaced relation of said lamps and said copyboard.

2. The combination in a camera, of a copyboard extending transversely to the focal axis of said camera, an overhead track, a carriage mounted for movement on said track in a plane containing said focal axis, a pair of pivotally connected carriers mounted on said carriage, a pair of arms each mounted for longitudinal movement in one of said carriers, a lamp suspended from each of said arms, and means for simultaneously adjusting said arms longitudinally.

3. In a lamp carrier for use with a process camera having a copyboard and a pair of lamps for directing light rays onto said copyboard, means for supporting said lamps to cause their rays to be directed at the same angle from each lamp on said copyboard, means actuated by a single operating member from a single position for simultaneously adjusting the spaced relation of both lamps to said copyboard without altering the angles of incidence of the light rays on the copyboard, and means for simultaneously and equally adjusting the angles of incidence of the rays of said lamps on the copyboard while maintaining the spaced relation of said lamps and the center of the copyboard and the incidence of said rays on said copyboard.

4. In a lamp carrier for use with a process camera having a copyboard and a pair of lamps for directing light rays onto said copyboard, a pair of supports each pivoted substantially in the plane of the copyboard and each carrying one of said lamps, means for simultaneously and equally adjusting the angularity of said arms with respect to the plane of said copyboard, and means for simultaneously and equally adjusting said lamps longitudinally of said arms.

5. In a lamp carrier for use with a process camera having a copyboard and a pair of lamps for directing light rays onto said copyboard, a pair of supporting arms each having one of said lamps mounted thereon, means for mounting said arms for pivotal movement about an axis substantially coaxial with the vertical center line of said copyboard, means actuated by the movement of either arm for effecting an equal movement of the other arm and thereby adjusting the angular spaced relation of said arms, and means for simultaneously adjusting said lamps in equal degree longitudinally of said arms.

6. In a lamp carrier for use with a process camera having a copyboard located in a vertical plane transversely to the focal axis of the camera and a pair of lamps, a pair of pivotally mounted arms diverging horizontally on opposite sides of said axis and making equal angles with the plane of said copyboard, means for mounting one of said lamps on each of said arms to direct its rays toward said copyboard, means interconnecting said arms for simultaneously adjusting said arms in equal degree with respect to the plane of the copyboard, and means for simultaneously adjusting said lamps longitudinally of said arms.

7. In a lamp carrier for use with a process camera having a copyboard extending transversely to the focal axis of the camera, a pair of arms pivoted substantially coaxially with the vertical center line of said copyboard, a pair of carriers each mounted to travel longitudinally on one of said arms, a lamp suspended from each of said carriers, means operative from a single position for moving said carriers simultaneously along said arms, and means interconnecting said arms for causing the pivotal movement of either arm to effect a corresponding movement of the other arm.

8. In a lamp carrier for use with a process camera having a copyboard extending transversely to the focal axis of the camera, a pair of arms pivoted substantially coaxially with the vertical center line of the copyboard, a pair of carriers, a pair of offset rollers mounted on each carrier and engaging the upper and lower sides of a separate one of said arms, a pair of lamps each suspended from one of said carriers adjacent the end thereof opposite the lower roller of that carrier, and means operatively connecting said carriers for simultaneously moving said carriers longitudinally of said arms.

9. In a lamp carrier for use with a process camera having a copyboard extending transversely to the focal axis of the camera and movable along a path parallel to said axis, a horizontal overhead track, a lamp carriage mounted for movement on said track along a path parallel to said focal axis, a pair of arms pivoted on said lamp carriage for movement in a horizontal plane, a pair of lamps each mounted on one of said arms and directed toward said copyboard, and means capable of operation from a single position for simultaneously adjusting said lamps in equal degree longitudinally of said arms.

10. In a lamp carrier for use with a camera having a lens and a copyboard directed toward said lens, an overhead track in the form of an inverted V-shaped member having its flanges diverging downwardly, a carriage mounted for movement longitudinally of said track, said carriage comprising rollers engaging the upper sides of said flanges and other rollers adapted to engage the under side of said track member at the apex thereof, a pair of arms pivoted on said carriage for movement in a horizontal plane, a lamp mounted on each of said arms, means for simultaneously effecting relative movement of said lamps and their respective arms longitudinally of said arms, and means for simultaneously adjusting the spaced relation of said arms while maintaining the spaced relation of said lamps with respect to said copyboard.

DAVID M. MURPHY.

REFERENCES CITED

The following references are of record in the file of this patent:

UNITED STATES PATENTS

| Number | Name | Date |
|---|---|---|
| 1,335,832 | Harvey | Apr. 6, 1920 |
| 1,497,851 | Hering | June 17, 1924 |
| 1,895,654 | Forrest | Jan. 31, 1933 |
| 1,950,033 | Morrison | Mar. 6, 1934 |
| 2,069,186 | Hineline | Jan. 26, 1937 |
| 2,107,074 | Hineline | Feb. 1, 1938 |
| 2,150,974 | Huebner | Mar. 21, 1939 |
| 2,235,355 | Brown | Mar. 18, 1941 |
| 2,239,379 | Bucky | Apr. 22, 1941 |
| 2,275,687 | Schubert | Mar. 10, 1942 |
| 2,346,217 | Heybourne | Apr. 11, 1944 |
| 2,376,416 | Campbell | May 22, 1945 |
| 2,408,247 | Wekeman | Sept. 24, 1946 |